United States Patent [19]

Solem

[11] 4,096,646

[45] Jun. 27, 1978

[54] DEVICE FOR IDENTIFYING AND LOCATING A STAR IN THE HEAVENS

[76] Inventor: Philip M. Solem, 30 W. Arrowhead Rd., Duluth, Minn. 55803

[21] Appl. No.: 791,687

[22] Filed: Apr. 28, 1977

[51] Int. Cl.² ............................................. G09B 27/06
[52] U.S. Cl. ............................................ 35/43; 35/47; 33/1 SC
[58] Field of Search ............... 35/43, 46 R, 46 A, 47; 33/1 SA, 1 SC, 268, 269, 270, 271

[56] References Cited

U.S. PATENT DOCUMENTS

| | | | |
|---|---|---|---|
| 506,084 | 10/1893 | Turnbull | 35/47 |
| 1,852,656 | 4/1932 | Johnson | 35/47 |
| 1,894,854 | 1/1933 | Denoyer | 35/46 R |
| 2,301,526 | 11/1942 | Dupler | 35/46 R |
| 2,349,515 | 5/1944 | Oberst | 35/47 |
| 2,429,754 | 10/1947 | Hagner | 35/46 R X |
| 2,697,280 | 12/1954 | Parker | 35/47 X |
| 2,754,597 | 7/1956 | Sylvester | 35/43 |
| 2,825,151 | 3/1958 | Farquhar | 35/43 |
| 3,257,728 | 6/1966 | Blomquist | 35/47 X |
| 3,981,080 | 9/1976 | Gama | 35/47 X |

FOREIGN PATENT DOCUMENTS 204,005  11/1908  Germany .................................. 35/47

*Primary Examiner*—William H. Grieb
*Attorney, Agent, or Firm*—Wicks & Nemer

[57] ABSTRACT

A device for identifying and locating a star in the heavens including an axis rod having a globe rotatably mounted thereon. A hoop is rotatably mounted on the axis rod for rotation about the globe. A mount having a sighting tube thereon is slidably mounted on said hoop with a screw member carried by the mount for engagement with the globe to secure the hoop and globe against rotation. The mount for the sighting tube has a pointer thereon for positioning the mount relative to star location on the globe. The axis rod is mounted on a universal joint secured to a stand for selectively positioning the angle of the axis rod and globe. The axis rod has a take-up nut thereon for engagement with the globe to prevent rotation of the globe on the rod.

12 Claims, 3 Drawing Figures

DEVICE FOR IDENTIFYING AND LOCATING A STAR IN THE HEAVENS

SUMMARY

The invention relates to a device for identifying and locating a star in the heavens and more particularly to a device for accomplishing the above which is relatively simple in nature, easy to operate and which is positive and exact in operation. The device employs a globe rotatably mounted on an axis rod. The globe has thereon the location of stars as the same appear in the heavens. A circular hoop is rotatably mounted on the axis rod and about the globe. Slidably mounted on the hoop is a mount on which is mounted a sighting tube and the mount carries a screw for engagement with the surface of the globe which secures the mount on the hoop and the globe relative to the mount and hoop. A take-up nut on the axis rod engages the globe and prohibits the globe from rotating. The mount carries a pointer for positioning opposite a location on the globe, and the axis rod is mounted on a universal joint which in turn is mounted on a tripod. The device allows use in both the northern and southern hemispheres.

The invention will appear more clearly from the following detailed description when taken in connection with the accompanying drawings, showing by way of example a preferred embodiment of the inventive idea wherein like numerals refer to like parts throughout.

In the drawings forming part of this application:

Figures 1, 2, 3:
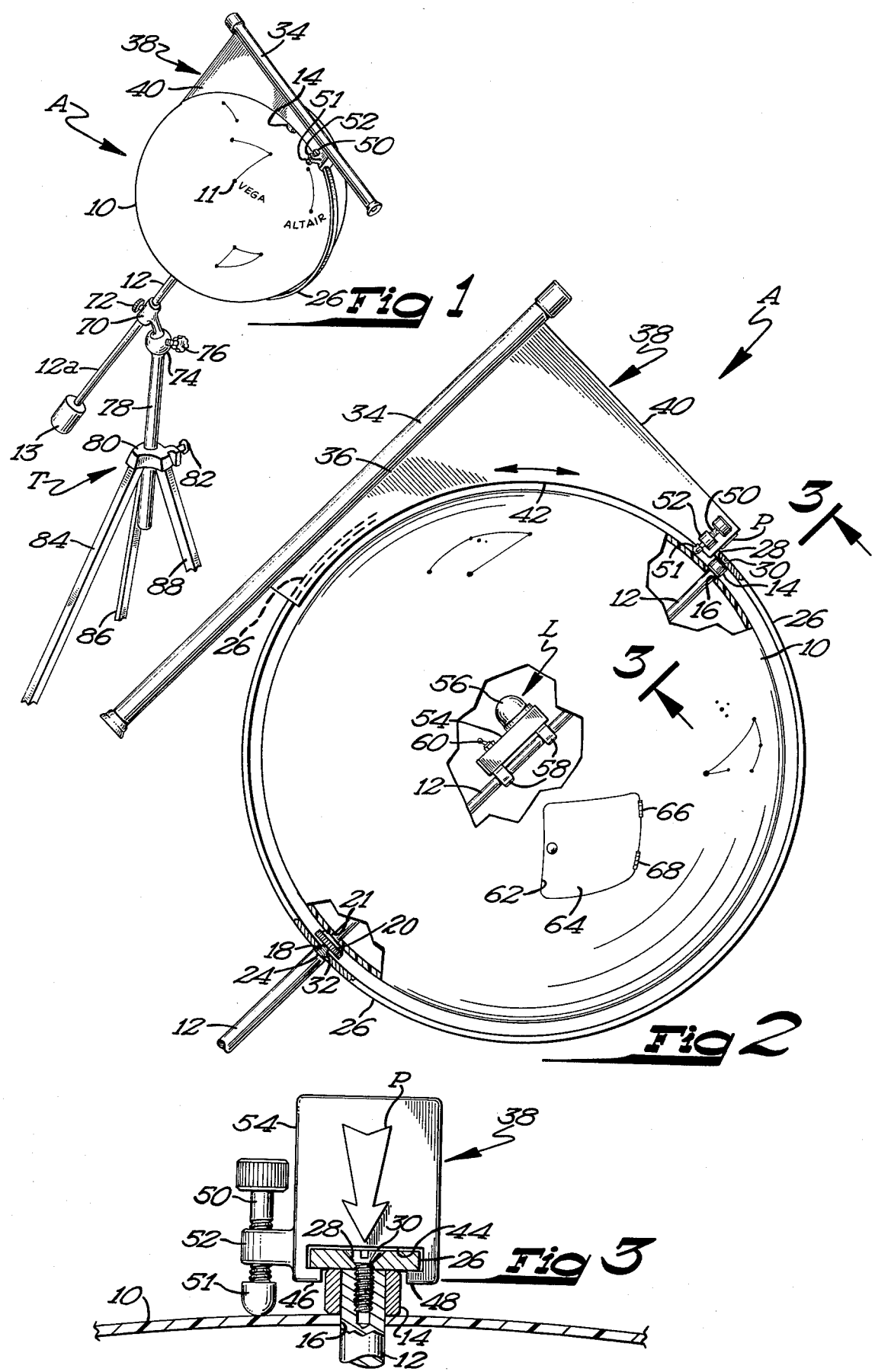
FIG. 1 is a perspective view of a device for locating and identifying heavenly bodies embodying the invention.
FIG. 2 is an enlarged side elevational view of the device without the counter balance and tripod, portions thereof being broken away.
FIG. 3 is a sectional view on the line 3 — 3 of FIG. 2.

Referring to the drawings in detail, the device for locating and identifying stars in the heavens A includes the hollow globe 10 which has the positions of stars located thereon as the same appear in the heavens as pin point holes 11 through which light shines from a bulb located therein and hereinafter described. The globe 10 may also have stars marked on the outside surface as to the location thereof in the heavens.

Further provided is the axis rod 12 which extends through the globe and mounts the globe for rotation thereon. The upper end of the rod 12 has mounted thereon the stop collar 14, and the rod extends freely through the hole 16 in the globe with the stop in abutting contact with the globe. The hole 16 allows the globe to rotate on the end of the outer end of the rod.

A lower portion of the rod is threaded as at 18 on which is mounted the threaded nut 20 and which is drawn up against the globe. The globe is formed with the hole 21 through which the rod 12 freely extends. With the nut 20 threadedly drawn up against the bottom of the globe, the same is locked to the axis rod 12. With the nut 20 loosened the globe can be rotated on the axis rod. The portion of the rod extended beyond the threaded portion 18 is enlarged thereby forming the shoulder 24. Mounted on the extreme lower end portion 12a of the rod 12 is the counter-weight 13, which is threaded and removable.

The numeral 26 designates a hoop having a diameter slightly greater than that of the globe. The hoop 26 is formed with a hole 28 through which extends the screw 30, and the screw 30 engages a threaded hole formed in the end of the rod 12 thereby mounting the hoop at one point on the outer end of the axis rod and spaced from the globe. The hoop is also formed with the hole 32 through which the threaded portion 18 extends thereby mounting the hoop on the inner portion of the axis rod 12 and against displacement on the shoulder 24.

Further provided is the star sighting tube 34 secured to the straight edge 36 of the mount 38 which terminates in the right angular disposed edge 40. Connecting the edges 36 and 40 is the arcuate concave edge 42 having a radius substantially that of the hoop. Formed in the edge 42 is the groove 44 having the overlying lips 46 and 48. The hoop 26 is mounted in the groove 44 and within the lips 46 and 48 whereby the mount 38 is slidably mounted on the hoop.

The mount 38 is adjustably secured in place on the hoop 26 and relative to the globe by means of the screw 50 having the rubber tip 51 and threadedly engaged with the lug 52 secured to and extending from the side of the mount 38. The end portion 54 of the mount 38 has formed thereon the pointer P.

When the screw 50 is tightened down and in tight engagement with the globe, it locks the mount 38 to the globe and the hoop 26 to the globe.

Further provided is a light unit L including the battery box 54 removably mounted on the axis rod 12 by means of the clips 56 and 58 within the globe 10, and mounted on the box 54 is the lamp 56 and the switch 60 connected thereto by conventional means. Access to the light unit L is made through the opening 62 in which is mounted the access door 64 mounted on the hinges 66 and 68 secured to the globe.

The axis rod 12 is slidable upon and removable from the clamp member 70 by means of the screw member 72 mounted thereon for dismantling the device. The clamp member 70 is formed as part of the ball and socket universal joint 74 which is secured in the desired position by means of the screw 76. The joint 74 is connected to the top of the rod standard 78 slidably mounted in the mount 80 and secured therein by the screw 82. The mount is part of the tripod T including the legs 84, 86, and 88 connected thereto which in turn support the globe in a stable portable manner.

OPERATION

In setting up the device A for use the tripod T is raised or lowered to accommodate the user. The screw 50 is withdrawn free of the globe and mount 38 is slidably moved along the hoop 26 until the pointer P is over the outer end of the axis rod 12, the end of the rod being at the location of the North Star (Polaris) on the globe in the northern hemisphere. Then the mount 38 and the hoop 26 are immobilized by tightening down the screw 50 upon the globe so that the tip thereof presses firmly against the surface of the globe.

The set screw 76 is then loosened to allow the ball and socket joint to rotate, and the entire device (mount, hoop and globe) is manipulated by handling the axis rod 12 and/or the counter-weight rod portion 12a while viewing through the tube 34 until the North Star is sighted through the tube 34. Then holding that position the set screw 76 is tightened whereby the globe is at the proper angle for use which requires no further adjustment so long as the tripod is not moved and that is so regardless of the time of night or season of the year.

A further setting is made as follows: Set screw 50 on the mount 38 is loosened with the globe remaining static, and the mount is moved along the hoop 26 and the hoop swiveled about axis rod 12 until pointer P is directly over the lead star of the Big Dipper on the globe surface. In this connection any given star would do as well as long as it is readily identifiable in the heavens and used consistently for subsequent adjustments.

Set screw 50 is then tightened against the surface of the globe so that the hoop 26 and mount 38 are locked into the globe's position. The user then loosens the nut 20, which locks the globe to the axis rod, so that the globe can rotate freely on the axis rod. Then viewing through the tube 34 again, the user rotates the globe, mount 38, tube 34 and hoop 26 which are all locked together and move as a unit, until the lead star of the Big Dipper is sighted through the sighting tube 34. The nut 20 is then tightened whereby the globe can no longer rotate.

As a result of fixing the two stars (North Star and the lead star of the Big Dipper) on the globe in direct relationship with their real counterparts in the heavens, every other star on the globe is in direct relation to its counterpart in the heavens. Periodically through the night, the second setting has to be retaken whereby the globe rotates gradually to reflect the apparent movement of the real stars across the night sky.

There are two uses of the device (a) to identify a star sighted in the heavens or (b) locate the position of a star in the heavens as indicated on the globe.

To identify a star sighted in the heavens, first slide and swivel the mount on the hoop so that the selected star for identification is sighted through the tube 34. Then tighten down the screw 50 and read the name of the star which appears below the pointer P on the mount.

To locate the position of a star in the heavens which is printed on the globe, slide and swivel the mount 38 until pointer P is over the selected star. Then tighten the screw 50 and view the corresponding star through the tube 34.

The device may also be used in the Southern Hemisphere as follows: First remove the screw 30 holding the hoop 26 to the end of the axis rod 12 and slide the globe 10 off of the axis rod 12. Then reverse the poles of the globe whereby the stars of the southern sky are uppermost and the North Star is lowermost. Next, replace the axis rod 12 and reassemble the device with screw 30.

The process of taking the initial two settings is different from that described above, for there is no clearly identifiable star at the polar axis in the southern sky corresponding to the North Star in the northern sky. A standard pocket compass is used to find due south, and the tripod T and the axis rod 12 are aligned so that the rod is pointing due south.

The mount 38 is then slid and swiveled so that the pointer P is over a star on the surface of the globe which the viewer can readily identify in the heavens, such as a star in the Southern Cross, a very well known constellation seen from the Southern Hemisphere. The set screw 50 on mount 38 is then tightened down.

The nut 20 which locks the globe to the axis rod is then loosened. The set screw on the universal swivel 74 is loosened, and the device is manipulated (axis rod arcing up or down without losing its due south orientation, and mount sliding and swiveling) until the selected star is seen through the sighting tube 34. When that is accomplished, nut 20 is tightened along with set screw 76 on universal 74.

The device is now oriented (the axis rod pointing at the polar axis, a "South Star" as it were, located as conveniently as the North Star. Throughout the night, adjustments must be made by re-sighting the initial star e.g. in the Southern Cross, and rotating the globe to follow the movement of the southern sky. Use of the compass and manipulation of the axis rod need no longer be done so long as the tripod is not moved. With the device oriented as above, stars are identified and/or located in the manner described above.

Having thus described the invention, what is claimed as new and desired to be secured by Letters Patent is:

1. A device for identifying and locating a star in the heavens comprising:
    (a) an axis rod,
    (b) a globe,
    (c) means rotatably mounting said globe on said axis rod,
    (d) means on said globe indicating the location counterpart of the stars in the heavens,
    (e) a hoop,
    (f) means mounting said hoop on said axis rod for rotation about said globe,
    (g) a mount,
    (h) means slidably mounting said mount on said hoop,
    (i) viewing means carried by said mount,
    (j) pointer means carried by said mount,
    (k) means for mounting said axis rod and globe at selected angles,
    (l) means for securing said globe against rotation on said axis rod,
    (m) means for securing said mount, said hoop and said globe against movement.

2. The device of claim 1 in which said means rotatably mounting said globe on said axis rod includes holes in said globe through which said rod extends.

3. The device of claim 2 in which said means mounting said hoop on said axis rod for rotation about said globe includes:
    (a) a hole in said hoop through which said axis rod extends, with
    (b) the outer end of said axis rod connected to said hoop.

4. The device of claim 3 in which
    (a) said mount includes a planar body having
    (b) guide means for sliding engagement with said hoop.

5. The device of claim 4 in which said viewing means carried by said mount is a tube.

6. The device of claim 5 in which said means for mounting said axis rod and said globe at selected angles includes:
    (a) a support, and
    (b) a universal joint mounted on said support and connected to said axis rod.

7. The device of claim 6 in which said means for securing said mount, said hoop and said globe against movement includes:
    (a) a threaded member,
    (b) means mounting said threaded member on said mount and engageable with said globe.

8. The device of claim 1 in which said means mounting said hoop on said axis rod for rotation about said globe includes:
    (a) a hole in said hoop through which said axis rod extends, with (b) the outer end of said axis rod connected to said hoop.

9. The device of claim 1 in which
(a) said mount includes a planar body having
(b) guide means for sliding engagement with said hoop.

10. The device of claim 1 in which said viewing means carried by said mount is a tube.

11. The device of claim 1 in which said means for mounting said axis rod and said globe at selected angles includes:
(a) a support, and
(b) a universal joint mounted on said support and connected to said axis rod.

12. The device of claim 1 in which said means for securing said mount, said hoop and said globe against movement includes a threaded member carried by said mount and engageable with said globe.

* * * * *